(12) United States Patent
Park et al.

(10) Patent No.: US 8,237,882 B2
(45) Date of Patent: Aug. 7, 2012

(54) LIQUID CRYSTAL DISPLAY DEVICE WITH GUIDE PANEL INCLUDING FIXING RIB

(75) Inventors: Jung-Hong Park, Paju-si (KR); Jun-Sik Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/591,309

(22) Filed: Nov. 16, 2009

(65) Prior Publication Data

US 2010/0208160 A1    Aug. 19, 2010

(30) Foreign Application Priority Data

Feb. 17, 2009    (KR) .................. 10-2009-0012915

(51) Int. Cl.
*G02F 1/1333*    (2006.01)
*G09F 13/04*    (2006.01)
(52) U.S. Cl. ...................................... 349/58; 362/97.11
(58) Field of Classification Search .............. 349/58–60, 349/68–70; 362/97, 217, 220, 224, 225, 362/632, 633, 634, 971, 64
See application file for complete search history.

(56) References Cited

U.S. PATENT DOCUMENTS

| | | | | |
|---|---|---|---|---|
| 5,659,376 A * | 8/1997 | Uehara et al. | ................... | 349/58 |
| 6,392,724 B2 * | 5/2002 | An et al. | ................... | 349/58 |
| 6,974,221 B2 * | 12/2005 | Wu et al. | ................... | 362/29 |
| 7,567,316 B2 * | 7/2009 | Hu | ................... | 349/58 |
| 2004/0090567 A1 * | 5/2004 | Lee et al. | ................... | 349/58 |
| 2006/0066774 A1 * | 3/2006 | Kim et al. | ................... | 349/65 |
| 2007/0159045 A1 * | 7/2007 | Ahn | ................... | 313/116 |
| 2007/0291471 A1 * | 12/2007 | Moon et al. | ................... | 362/97 |
| 2008/0037288 A1 * | 2/2008 | Kim | ................... | 362/634 |
| 2008/0081174 A1 * | 4/2008 | Lee | ................... | 428/315.5 |
| 2008/0111942 A1 * | 5/2008 | Lee et al. | ................... | 349/58 |

* cited by examiner

*Primary Examiner* — Akm Ullah
(74) *Attorney, Agent, or Firm* — McKenna Long & Aldridge LLP

(57) ABSTRACT

A liquid crystal display device includes a cover bottom, a reflection sheet over the cover bottom, lamps over the reflection sheet, a diffuser plate over the lamps, a plurality of optical sheets over the diffuser plate, a guide panel of a rectangular shape surrounding edges of the diffuser plate and the plurality of optical sheets, the guide panel including fixing ribs at an inner surface thereof, a liquid crystal panel over the plurality of optical sheets and including first and second substrates and a liquid crystal layer therebetween, a top cover covering edge portions of a front surface of the liquid crystal panel and combined with the guide panel and the cover bottom, wherein the fixing ribs contact edges of the diffuser plate such that a force is applied to the diffuser plate.

7 Claims, 6 Drawing Sheets

LIQUID CRYSTAL DISPLAY DEVICE WITH GUIDE PANEL INCLUDING FIXING RIB

This application claims the benefit of Korean Patent Application No. 10-2009-0012915 filed in Korea on Feb. 17, 2009, which is hereby incorporated by reference for all purposes as if fully set forth herein.

BACKGROUND OF THE DISCLOSURE

1. Field of the Invention

The disclosure relates to a liquid crystal display device that prevents a diffuser plate from being thermally transformed.

2. Discussion of the Related Art

According to the rapid development in information technology, flat panel display (FPD) devices having thin thickness, light weight, and lower power consumption, such as liquid crystal display (LCD) devices, plasma display panels (PDPs), electroluminescent display (ELD) devices and field emission display (FED) devices, have been developed and have replaced cathode ray tubes (CRTs).

Among these devices, liquid crystal display (LCD) devices are most widely used for monitors of notebook computers, monitors of personal computers and televisions due to excellent moving images and high contrast ratio.

By the way, the LCD devices require an additional light source because the LCD devices are not self-luminescent. Therefore, a backlight unit is disposed at a rear side of a liquid crystal (LC) panel and emits light into the LC panel, whereby discernible images can be displayed.

Backlight units are classified into an edge type and a direct type according to the position of a light source with respect to a display panel. In edge-type backlit units, one or a pair of lamps are disposed at one side or each of two sides of a light guide panel of a backlight unit. In direct-type backlight units, a plurality of lamps are disposed directly under a display panel.

FIG. 1 is a cross-sectional view of a liquid crystal display (LCD) device including a direct-type backlight unit according to the related art. In FIG. 1, a related art LCD device includes a liquid crystal panel 10, a backlight unit 20, a guide panel 30, a top cover 40 and a cover bottom 50.

The liquid crystal panel 10 includes first and second substrates 12 and 14. The backlight unit 20 is disposed over a rear surface of the liquid crystal panel 10.

The backlight unit 20 includes a reflection sheet 22, a plurality of lamps 24, a diffuser plate 26, and a plurality of optical sheets 28. The plurality of lamps 24 are disposed over the reflection sheet 22, and the diffuser plate 26 and the plurality of optical sheets 28 are sequentially disposed over the plurality of lamps 24. The plurality of optical sheets 28 include a diffuser sheet and a light-concentrating sheet.

The liquid crystal panel 10 and the backlight unit 20 are modularized with the top cover 40, the guide panel 30 and the cover bottom 50. More particularly, the guide panel 30 of a rectangular frame shape surrounds side surfaces of the liquid crystal panel 10 and the backlight unit 20. The top cover 40 covers edges of a front surface of the liquid crystal panel 10, and the cover bottom 50 covers a rear surface of the backlight unit 50. The top cover 40 and the cover bottom 50 are combined with the guide panel 30 to thereby constitute one-united body.

Recently, the LCD devices have been generally used as portable computer monitors, desktop computer monitors and wall-mounted televisions, and LCD devices having a large size and a thin thickness have been widely researched.

As an example, a trial of reducing a distance A between the lamps 24 and the diffuser plate 26 of the backlight unit 20 has been suggested and developed to provide a thin LCD device.

However, to provide the liquid crystal panel with a high quality plane light source, various optical designs are considered. Among the designs, it is important to appropriately maintain the distance between the lamps 24 and the diffuser plate 26. That is, when the distance A between the lamps 24 and the diffuser plate 26 is considerably short, thermal transformation occurs in the diffuser plate 26 due to the heat from the lamps 24 as shown in FIG. 2.

Table 1 shows shifts measured at five points of the diffuser plate 26 according to ON and OFF of the lamps 24. The larger the shift width of the diffuser plate 26 is, the more the diffuser plate 26 has movement. Accordingly, the thermal transformation of the diffuser plate 26 is confirmed. Here the point p3 is a center of the diffuser plate 26, the points p1 and p5 respectively are left and right edges of the diffuser plate 26, and the points p2 and p3 respectively are between the points p3 and p1 and between the points p3 and p5.

TABLE 1

|  | p1 | p2 | p3 | p4 | p5 |
| --- | --- | --- | --- | --- | --- |
| Max. | 0.87 | 2.68 | 3.36 | 1.00 | 2.11 |
| Min. | −0.32 | −0.43 | −0.43 | −0.50 | −0.06 |
| shift width | 1.1.19 | 3.11 | 3.79 | 1.50 | 2.17 |

That is, the diffuser plate 26 has the difference in the shift widths at the points p1, p3 and p5 within a range of at least 1.62 to 2.6, and it is noticed that there occurs the thermal transformation in the diffuser plate 26.

As shown in the graph of FIG. 3, the distance A between the lamps 24 and the diffuser plate 26 is not uniform due to the thermal transformation of the diffuser plate 26. The diffuser plate 26 is too close by the lamps 24 in some areas, and light from the lamps 24 has strong straightness. Accordingly, the shapes of the lamps 24 are shown in a displayed image, and lamp mura defects are caused. Thus, the display quality of the liquid crystal display device is lowered.

SUMMARY

Accordingly, the present invention is directed to a liquid crystal display device including the same that substantially obviate one or more of the problems due to limitations and disadvantages of the related art.

A liquid crystal display device includes a cover bottom, a reflection sheet over the cover bottom, lamps over the reflection sheet, a diffuser plate over the lamps, a plurality of optical sheets over the diffuser plate, a guide panel of a rectangular shape surrounding edges of the diffuser plate and the plurality of optical sheets, the guide panel including fixing ribs at an inner surface thereof, a liquid crystal panel over the plurality of optical sheets and including first and second substrates and a liquid crystal layer therebetween, a top cover covering edge portions of a front surface of the liquid crystal panel and combined with the guide panel and the cover bottom, wherein the fixing ribs contact edges of the diffuser plate such that a force is applied to the diffuser plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 4:
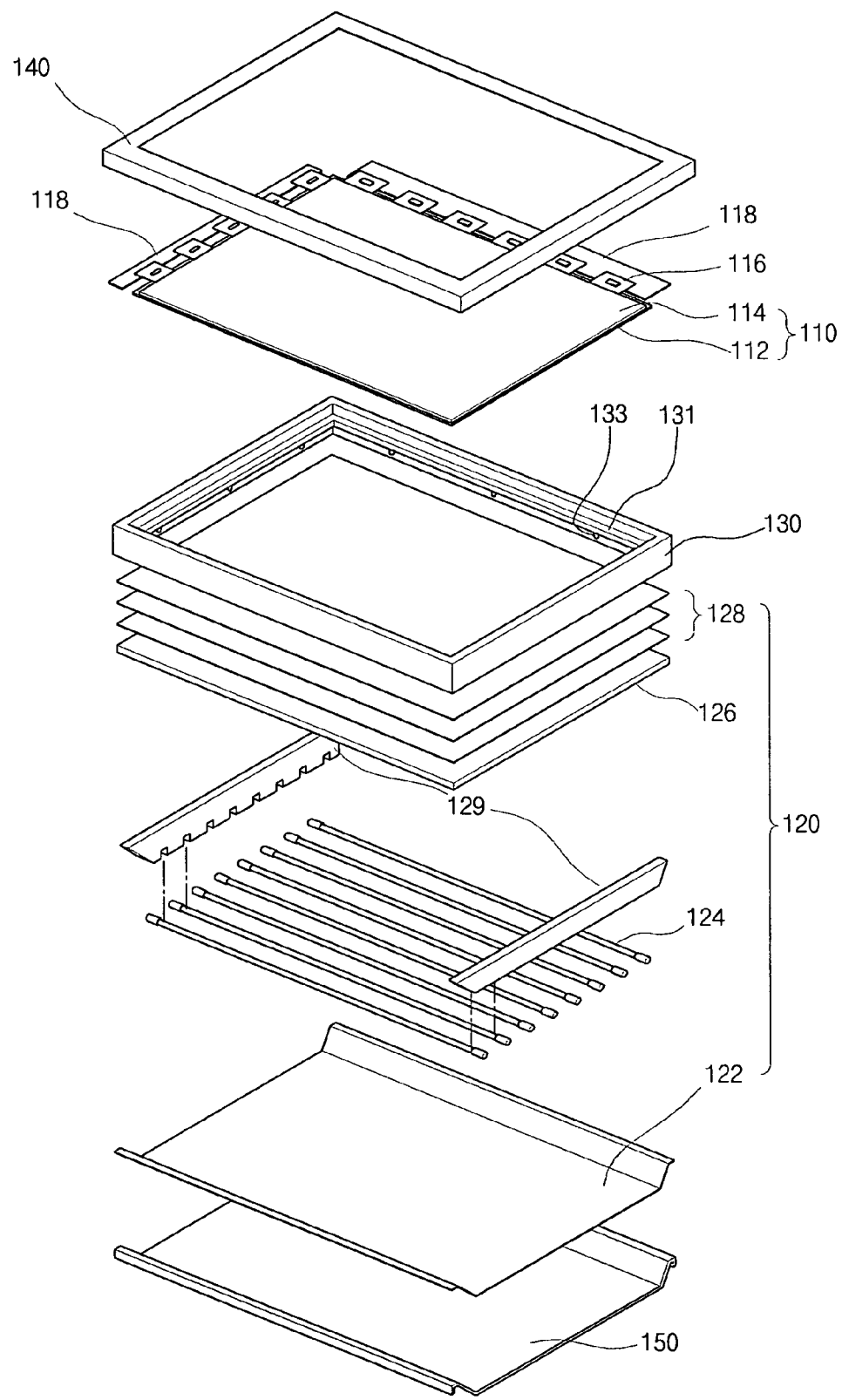
FIG. 4 is an exploded perspective view illustrating a liquid crystal display (LCD) device according to an exemplary embodiment of the present invention.

FIG. 4 is an exploded perspective view illustrating a liquid crystal display (LCD) device according to an exemplary embodiment of the present invention.

In FIG. 4, the LCD device according to the exemplary embodiment of the present invention includes a liquid crystal panel 110, a backlight unit 120, a guide panel 130, a top cover 140 and a cover bottom 150.

The liquid crystal panel 110 displays images. The liquid crystal panel 110 includes first and second substrates 112 and 114 facing and spaced apart from each other, and a liquid crystal layer (not shown) is interposed between the first and second substrates 112 and 114. The liquid crystal panel 110 may be an active matrix type, in which elements are arranged in a matrix shape. Although not shown in the figure, gate lines and data lines are formed on an inner surface of the first substrate 112, and the gate lines and the data lines cross each other to define pixel regions. A thin film transistor is formed at each crossing of the gate and data lines. A pixel electrode is connected to the thin film transistor and disposed in each pixel region.

Red, green and blue color filters (not shown) and a black matrix are formed on an inner surface of the second substrate 114, which may be referred to as a color filter substrate. The color filters correspond to the pixel regions. The black matrix surrounds each of the color filters and shields the gate lines, the data lines and the thin film transistors. A transparent common electrode (not shown) covers the color filters and the black matrix.

A printed circuit board 118 is attached to at least a side of the liquid crystal panel 110 via connecting means 116 such as flexible printed circuit boards, for example. The printed circuit board 118 is bent toward a side surface of the guide panel 130 or a rear surface of the cover bottom 150 during a module assembly process.

Although shown in the figure, upper and lower alignment layers are formed between the liquid crystal layer and the second substrate 114 and between the liquid crystal layer and the first substrate 112, respectively. The upper and lower alignment layers determine an initial direction of liquid crystal molecules. A seal pattern is formed along edge portions of the first and second substrates 112 and 114 to prevent the liquid crystal layer from leaking. A lower polarizer is disposed on an outer surface of the first substrate 112, and an upper polarizer is disposed on an outer surface of the second substrate 114.

The backlight unit 120 is disposed at a rear surface of the liquid crystal panel 110 and provides the liquid crystal panel 110 with light. The liquid crystal panel 110 changes transmittance of the light to display images.

The backlight unit 120 includes a reflection sheet 122, a plurality of lamps 124, a diffuser plate 126, and a plurality of optical sheets 128. The plurality of lamps 124 are spaced apart from each other over the reflection sheet 122. The diffuser plate 126 and the plurality of optical sheets 128 are sequentially disposed over the lamps 124.

The lamps 124 may be fluorescent lamps such as cold cathode fluorescent lamps or external electrode fluorescent lamps. Light-emitting diode lamps may be used for the lamps 124.

A couple of side supports 129 cover respective ends of each lamp 124 to fix and support the lamps 124. The side supports 129 are combined with the cover bottom 150. The side supports 129 uniformly maintain a distance between the lamps 124 and the diffuse plate 126.

The reflection sheet 122 disposed under the lamps 124 reflects light emitted from the lamps 124 toward the liquid crystal panel 110 to increase brightness of the light.

The diffuser plate 126 spaced apart from the lamps 124 has various haze properties depending on light uniformity. Here, to control haze values, the diffuser plate 126 may include light-diffusing means such as beads or include fine patterns at a lower surface. The beads diffuse light incident on the diffuser plate 126 and prevent light from being locally concentrated. The diffuser plate 126 without the beads controls diffusion angles of light according to shapes of the fine patterns and diffuses light to thereby prevent light from being locally concentrated.

The plurality of optical sheets over the diffuser plate 126 includes a diffuser sheet and at least a light-concentrating sheet. The diffuser sheet is disposed right over the diffuser plate 126. The diffuser sheet diffuses light from the diffuser plate 126 and controls a direction of light so that light may go toward the light-concentrating sheet. The diffused light passing through the diffuser sheet is concentrated toward the liquid crystal panel 110 by the light-concentrating sheet.

Accordingly, light emitted from the lamps 124 is changed into uniform and high-qualified one while passing through the diffuser plate 126 and the plurality of optical sheets 128 and then is provided to the liquid crystal panel 110, whereby the liquid crystal panel 110 displays images.

The liquid crystal panel 110 and the backlight unit 120 are modularized with the top cover 140, the guide panel 130 and the cover bottom 150. The top cover 140 has a rectangular frame shape with an L-shaped cross-section to cover edges of a front surface and side surfaces of the liquid crystal panel 110. The front surface of the liquid crystal panel 110 has an opening, wherein images of the liquid crystal panel 110 are displayed through the opening.

The cover bottom 150, on which the liquid crystal panel 110 and the backlight unit 120 are disposed and which is a base of the liquid crystal display module, includes a bottom plate of a rectangular shape. Edges of the bottom plate of the cover bottom 150 are bent toward the liquid crystal panel 110 and the backlight unit 120.

The guide panel 130 of a rectangular shape is disposed over the cover bottom 150 and surrounds edges of the liquid crystal panel 110 and the backlight unit 120. The guide panel 130 is combined with the top cover 140 and the cover bottom 150. The guide panel 130 may be molded from resin. The guide panel 130 includes a projecting part 131 along and at an inner surface thereof. The guide panel 130 further includes a plurality of fixing ribs 133 spaced apart from each other under the projecting part.

Here, the top cover 140 may be referred to as a case top or a top case. The guide panel 130 may be referred to as a support main, a main support or a mold frame. The cover bottom 150 may be referred to as a bottom cover.

The liquid crystal display device of the present invention has a thinner thickness than the related art liquid crystal display device, and there is no thermal transformation in the liquid crystal display device. This will be explained hereinafter in more detail with reference to FIGS. 5A and 5B.

Figure 5A:
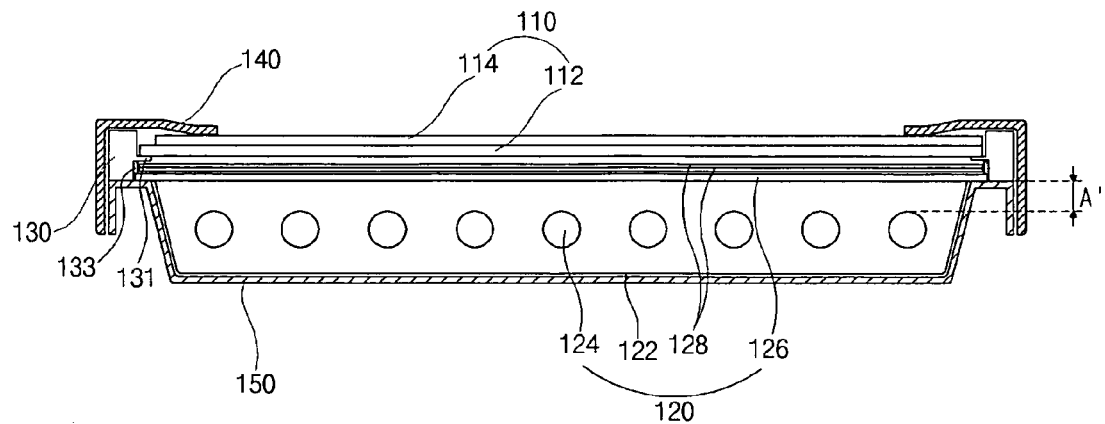
FIG. 5A is a cross-sectional view of a modularized liquid crystal display device of FIG. 4.
Figure 5B:
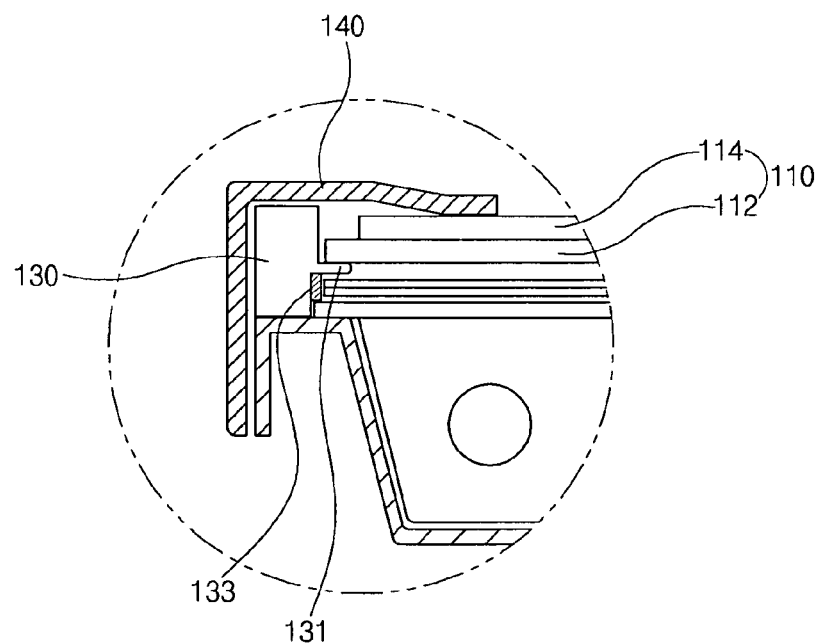
FIG. 5B is an enlarged view of a part of FIG. 5A.

FIG. 5A is a cross-sectional view of a modularized liquid crystal display device of FIG. 4, and FIG. 5B is an enlarged view of a part of FIG. 5A.

In FIGS. 5A and 5B, the reflection sheet 122, the plurality of lamps 124 over the reflection sheet 122, the diffuser plate 126 over the lamps, and the plurality of optical sheets 128 over the diffuser plate 126 constitute the backlight unit 120.

The liquid crystal panel 110 is disposed over the backlight unit 120 and includes the first and second substrates 112 and 114 and the liquid crystal layer (not shown) interposed therebetween. The polarizers selectively transmitting light are attached at outer surfaces of the first and second substrates 112 and 114, respectively.

The edges of the backlight unit 120 and the liquid crystal panel 110 are surrounded by the guide panel 130 and are divided by the projecting part 131 formed along and at the inner surface of the guide panel 130.

More particularly, the liquid crystal panel 110 is disposed on an upper surface of the projecting part 131 of the guide panel 130, and a rear surface of the liquid crystal panel 110 is partially supported by the projecting part 131. The optical sheets 128 and the diffuser plate 126 of the backlight unit 120 are sequentially disposed on a lower surface of the projecting part 131 of the guide panel 130. The edges of the diffuser plate 126 are pressed by the fixing ribs under the projecting part 131.

The cover bottom 150 is disposed under the backlight unit 120, and the top cover 140, which surrounds the edge portions of the front surface and the side surfaces of the liquid crystal panel 110, is combined with the guide panel 130 and the cover bottom 150.

Like this, the liquid crystal panel 110 and the backlight unit 120 are modularized as one-united body and are protected from outer impacts, and light loss can be minimized.

Figure 1:
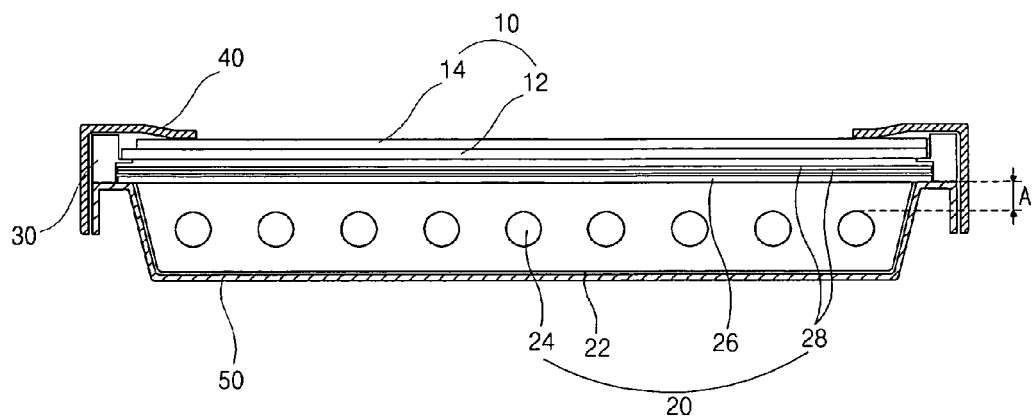
FIG. 1 is a cross-sectional view of a liquid crystal display (LCD) device including a direct-type backlight unit according to the related art.
Figure 2:
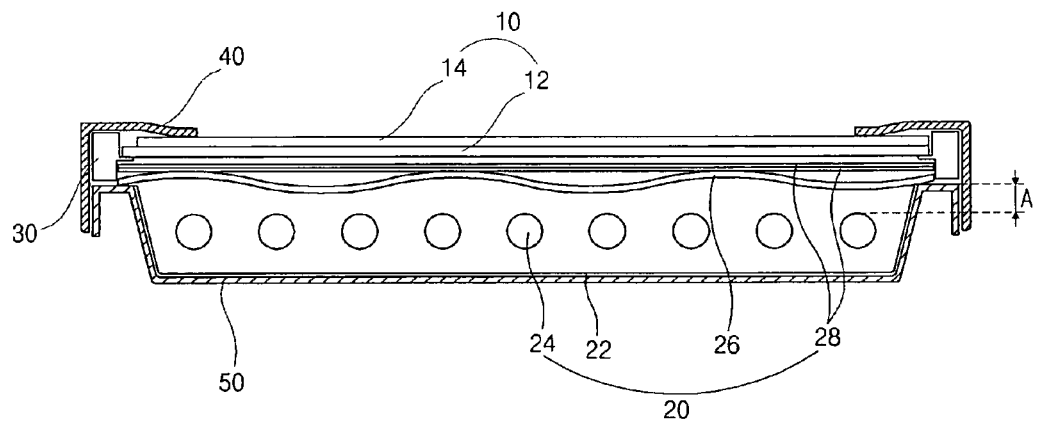
FIG. 2 is a cross-sectional view of a related art LCD device including a thermally transformed diffuser plate.
Figure 3:
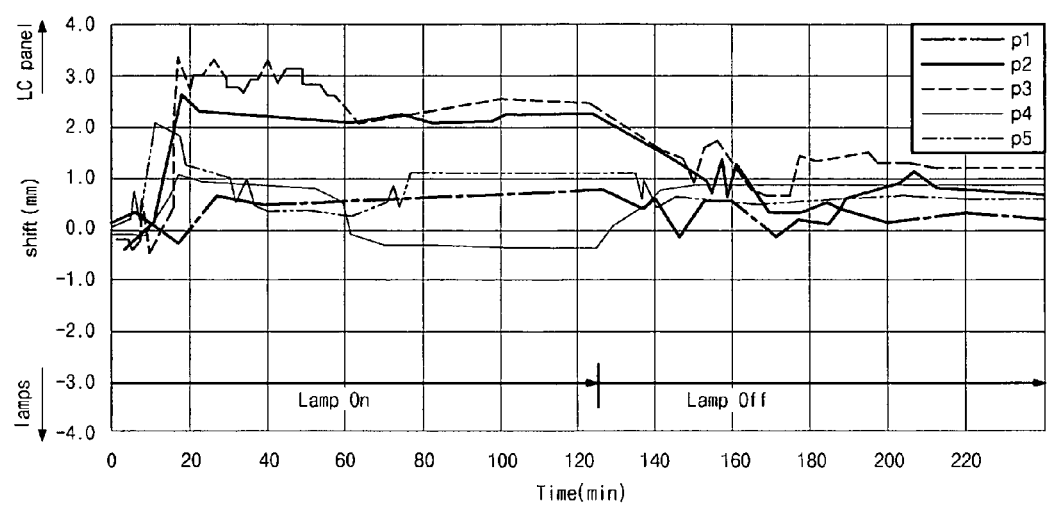
FIG. 3 is a graph of confirming a thermal transformation of a diffuser plate in a related art LCD device.

The liquid crystal display device of the present invention has a lower height than the related art liquid crystal display device because the distance A' between the lamps 124 and the diffuser plate 126 is shorter than the distance A of FIG. 1.

Although the distance A' between the lamps 124 and the diffuser plate 126 is decreased, there is no thermal transformation of the diffuser plate 126, and thus lamp mura defects are not caused. This is why the fixing ribs 133 press the edges of the diffuser plate 126 and apply a force to the diffuser plate 126 to thereby fix the diffuser plate 126.

More particularly, when the distance A' between the lamps 124 and the diffuser plate 126 is decreased to provide a liquid crystal display device having a thin thickness, the diffuser plate 126 may be thermally transformed due to the heat from the lamps 124, and the fixing ribs 133 of the guide panel 130 press the edges of the diffuser plate 126 and apply the force to the diffuser plate 126, whereby the thermal transformation of the diffuser plate 126 can be prevented.

Table 2 shows shifts measured at five points of the diffuser plate 126 according to ON and OFF of the lamps 124. The smaller the shift width of the diffuser plate 126 is, the less the diffuser plate 126 has movement. Accordingly, it is confirmed that there occurs no thermal transformation of the diffuser plate 126. Here the point p3 is a center of the diffuser plate 26, the points p1 and p5 respectively are left and right edges of the diffuser plate 26, and the points p2 and p3 respectively are between the points p3 and p1 and between the points p3 and p5.

TABLE 2

|  | p1 | p2 | p3 | p4 | p5 |
| --- | --- | --- | --- | --- | --- |
| Max. | 1.56 | 0.99 | 0.05 | 2.06 | 1.01 |
| Min. | 0 | −0.98 | −1.23 | −0.32 | −0.21 |
| shift width | 1.56 | 1.97 | 1.28 | 2.38 | 1.22 |

That is, the related art diffuser plate 26, in which there is thermal transformation, has the difference in the shift widths at the points p1, p3 and p5 within a range of at least 1.62 to 2.6. However, in the present invention, since the fixing ribs 133 of the guide panel 130 press the edges of the diffuser plate 126 to apply the force to the diffuser plate 126, the difference in the shift widths at the points p1, p3 and p5 is within a range of −0.28 to 0.66.

Figure 6:
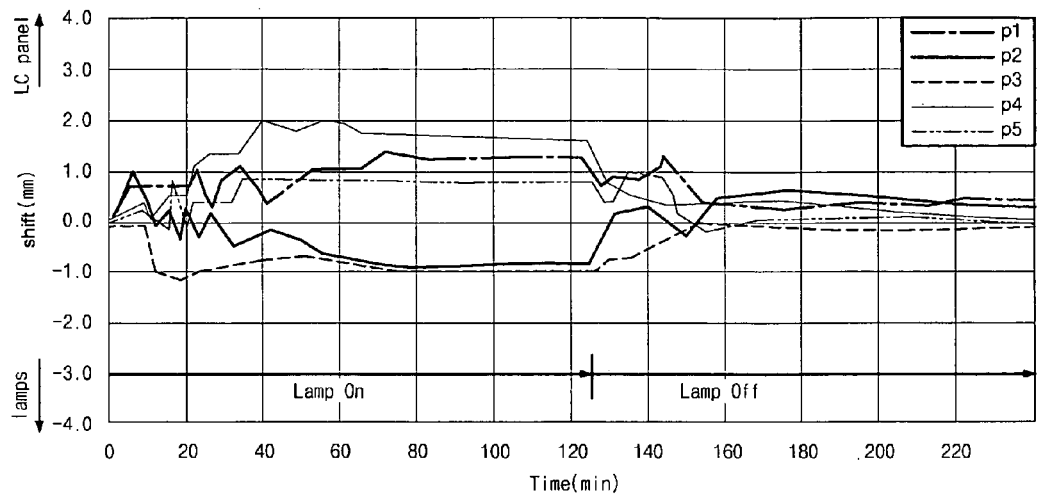
FIG. 6 is a graph of confirming a thermal transformation of a diffuser plate in a LCD device of the present invention.

Like this, the thermal transformation is not caused in the diffuser plate 126 of the present invention. As shown in the graph of FIG. 6, the distance between the lamps 124 and the diffuser plate is uniformly maintained. Accordingly, lamp mura defects can be prevented, which is stripe patterns of the lamps 124 shown in a displayed image because the distance between the lamps 124 and the diffuser plate 126 is not uniform and the lamps 124 become close by the diffuser plate 126 in some areas. Therefore, the display quality of the liquid crystal display device can be improved.

Figure 7A:
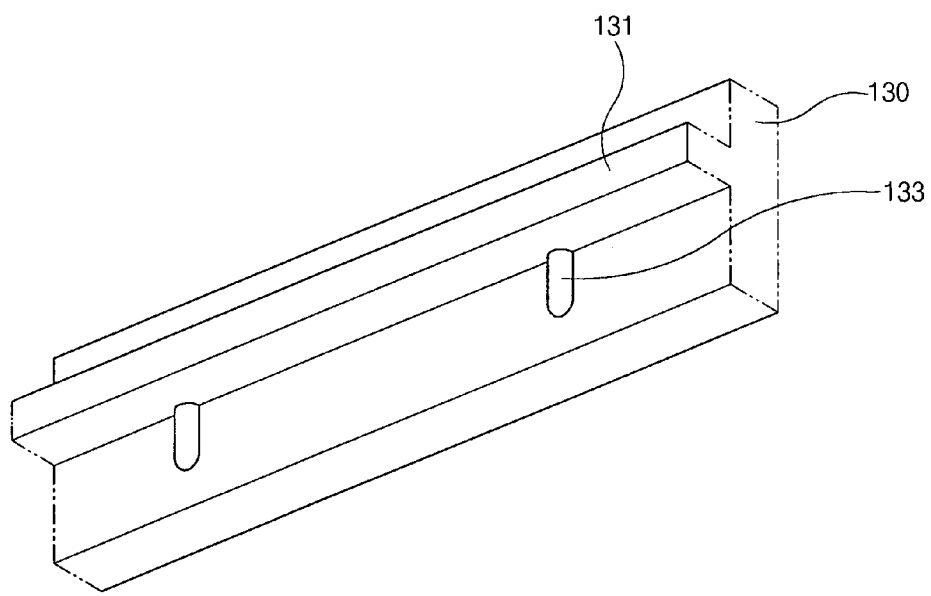
FIGS. 7A and 7B are views of showing fixing ribs according to an exemplary embodiment of the present invention.
Figure 7B:
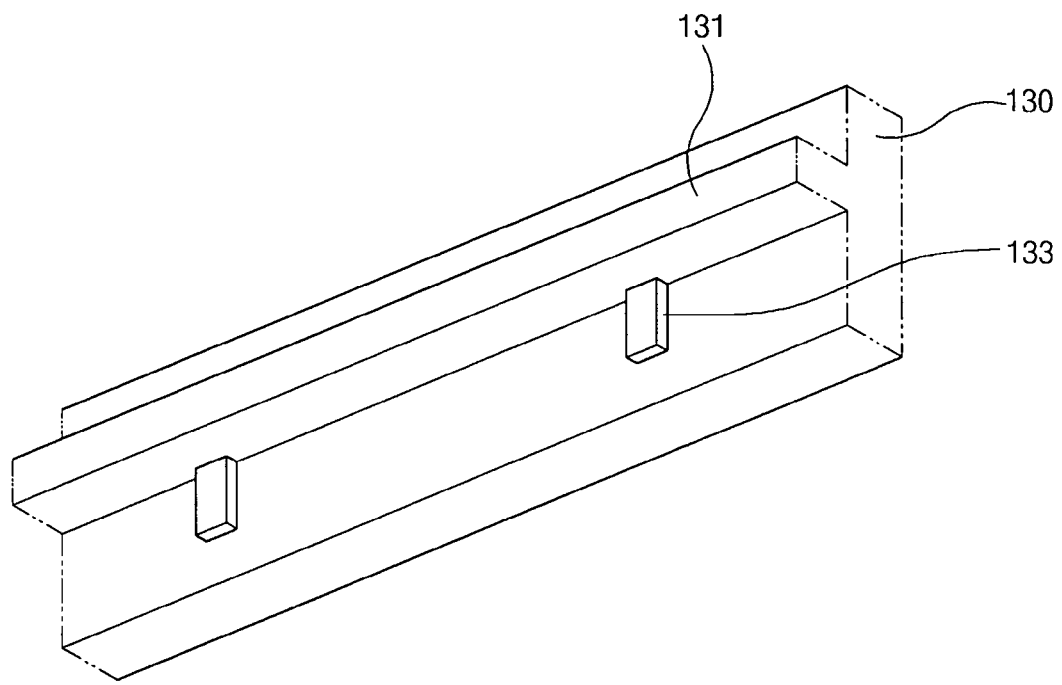

FIGS. 7A and 7B show fixing ribs according to an exemplary embodiment of the present invention.

In FIGS. 7A and 7B, the fixing ribs 133 are formed under the projecting part 131 at the inner surface of the guide panel 130. The fixing ribs 133 are spaced apart from each other along the projecting part 131 of the guide panel 130.

The fixing ribs 133 may have a semicircular shape as shown in FIG. 7A such that the fixing ribs 133 make a linear contact with the diffuser plate 126 of FIG. 5A. The fixing ribs 133 may have a rectangular shape as shown in FIG. 7B such that the fixing ribs 133 make a plane contact with the diffuser plate 126 of FIG. 5A.

The fixing ribs 133 of FIG. 7B having the rectangular shape may apply stronger force to the diffuser plate 126 of FIG. 5A than the fixing ribs 133 of FIG. 7A having the semicircular shape. The fixing ribs 133 of FIG. 7B having the rectangular shape, beneficially, may be used for a large-sized liquid crystal display device having a relatively large diffuser plate 126 of FIG. 5A as compared to the fixing ribs 133 of FIG. 7A having the semicircular shape.

In the present invention, the fixing ribs 133 are formed in the guide panel 130, and the fixing ribs 133 press the edges of the diffuser plate 126 of FIG. 5A and apply the force to the diffuser plate 126 of FIG. 5A, whereby the thermal transformation of the diffuser plate 126 of FIG. 5A can be prevented.

In the meantime, it is desirable that the fixing ribs 133 has a distance from the bottom surface of the guide panel 130 as long as a thickness of the diffuser plate 126 of FIG. 5A. That is, the fixing ribs 133 are spaced apart from the bottom surface of the guide panel 130 with a distance equal to the thickness of the diffuser plate 126 of FIG. 5A. The fixing ribs 133 are formed of the same material as the guide panel 130.

Like this, in the present invention, since the fixing ribs are formed in the guide panel, the fixing ribs press the edges of the diffuser plate and apply the force to the diffuser plate, whereby the thermal transformation of the diffuser plate can be prevented. Therefore, the distance between the lamps and the diffuser plate is uniformly maintained, and lamp mura defects can be prevented. The display quality of the liquid crystal display device can be improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a cover bottom;
    a reflection sheet over the cover bottom;
    lamps over the reflection sheet;
    a diffuser plate over the lamps;
    a plurality of optical sheets over the diffuser plate;
    a guide panel of a rectangular shape surrounding side surfaces of the diffuser plate and the plurality of optical sheets, the guide panel including fixing ribs at an inner surface thereof;
    a liquid crystal panel over the plurality of optical sheets and including first and second substrates and a liquid crystal layer therebetween;
    a top cover covering edge portions of a front surface of the liquid crystal panel and combined with the guide panel and the cover bottom,
    wherein the fixing ribs contact edges of an upper surface of the diffuser plate and the diffuser plate is disposed between the fixing ribs and the cover bottom such that a force is applied to the diffuser plate.

2. The device according to claim 1, wherein a projecting part is formed at the inner surface of the guide panel to support the liquid crystal panel, and the fixing ribs are spaced apart from each other under the projecting part.

3. The device according to claim 1, wherein the fixing ribs are spaced apart from a bottom surface of the guide panel with a distance equal to a thickness of the diffuser plate.

4. The device according to claim 1, wherein the fixing ribs are formed of a same material as the guide panel.

5. The device according to claim 1, wherein the diffuser plate includes beads therein.

6. The device according to claim 1, wherein the diffuser plate includes fine patterns at a lower surface.

7. The device according to claim 1, wherein the fixing ribs have one of a semicircular shape and a rectangular shape.

* * * * *